(12) United States Patent
Dhanda et al.

(10) Patent No.: US 9,078,118 B2
(45) Date of Patent: Jul. 7, 2015

(54) WIRELESS COMMUNICATION SYSTEMS AND METHODS

(75) Inventors: Mungal Singh Dhanda, Slough (GB); Zhi-Zhong Yu, Reading (GB); Divaydeep Sikri, Franborough (GB)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 13/218,231

(22) Filed: Aug. 25, 2011

(65) Prior Publication Data

US 2012/0051303 A1    Mar. 1, 2012

Related U.S. Application Data

(60) Provisional application No. 61/377,881, filed on Aug. 27, 2010.

(51) Int. Cl.
*H04W 4/00* (2009.01)
*H04W 8/22* (2009.01)
*H04W 28/04* (2009.01)
(Continued)

(52) U.S. Cl.
CPC ............. *H04W 8/22* (2013.01); *H04W 28/04* (2013.01); *H04W 48/08* (2013.01); *H04W 72/082* (2013.01)

(58) Field of Classification Search
USPC .............. 370/277, 278, 282, 299, 328, 332, 370/395.21, 437, 441, 442, 478–481
See application file for complete search history.

(56) References Cited

U.S. PATENT DOCUMENTS

2009/0163158 A1* 6/2009 Chitrapu et al. ........... 455/127.5
2010/0008230 A1  1/2010 Khandekar et al.
(Continued)

FOREIGN PATENT DOCUMENTS

CN  101772982 A  7/2010
JP  2003143654 A  5/2003
(Continued)

OTHER PUBLICATIONS

3rd Generation Partnership Project; Technical Specification Group Core Network and Terminals; Mobile Radio Interface Layer 3 Specification; Core Network Protocols; Stage 3 (Release 8 ), 3GPP TS 24.008, V8.10.0, Jun. 1, 2010, pp. 370-483, XP002665372.
(Continued)

*Primary Examiner* — Zewdu A Beyen
(74) *Attorney, Agent, or Firm* — Qualcomm IP Department; James Hunt Yancey, Jr.

(57) ABSTRACT

Embodiments of the present invention include wireless communication systems having one or more network components that can communicate with at least one mobile station in an interference environment. A transmitter can transmit data indicating a set of communication modes in which a mobile station is capable of operating and for at least one mode of communication in the set an indication of interference rejection capability. The indicating data can be received by a receiver. A resource allocator can allocate system resources based on the indicating data for use during a connection between network components (e.g., a network apparatus and a mobile station). Allocation of system resources can fully or partially depend on a connection's communication mode, an indication of interference rejection capability of a mobile station for the mode of communication of the connection, and/or an interference environment expected during the connection. Other aspects, embodiments, and features are also claimed and described.

47 Claims, 6 Drawing Sheets

(51) Int. Cl.
  *H04W 48/08* (2009.01)
  *H04W 72/08* (2009.01)

(56) References Cited

U.S. PATENT DOCUMENTS

| | | | |
|---|---|---|---|
| 2010/0056170 A1* | 3/2010 | Lindoff et al. | 455/452.1 |
| 2010/0081445 A1* | 4/2010 | Aghili et al. | 455/450 |
| 2011/0064043 A1* | 3/2011 | Balachandran et al. | 370/330 |

FOREIGN PATENT DOCUMENTS

| | | | |
|---|---|---|---|
| JP | 2006238423 A | 9/2006 | |
| JP | 2007502089 A | 2/2007 | |
| JP | 2010034908 A | 2/2010 | |
| WO | WO-2005002252 | 1/2005 | |
| WO | WO2008157770 A2 | 12/2008 | |
| WO | WO-2010006297 A2 | 1/2010 | |
| WO | WO 2010056162 A1 * | 5/2010 | 370/338 |

OTHER PUBLICATIONS

3rd Generation Partnership Project; Technical Specification Group GSM/EDGE Radio Access Network; Release Independent Downlink Advanced Receiver Performance (DARP); Implementation guidelines (Release 9 ), 3GPP TS 45.015, V9.0.0, Dec. 1, 2009, pp. 1-7, XP002665371.

International Search Report and Written Opinion—PCT/US2011/049434—ISA/EPO—Dec. 21, 2011.

Notification of Transmittal of the International Preliminary Report on Patentability—From the EPO Serving as the International Preliminary Examining Authority—Aug. 2, 2013.

Response to Second Written Opinion Under Article 34—International Searching Authority—Dec. 28, 2012.

Taiwan Search Report—TW100130752—TIPO—Dec. 17, 2013.

Taiwan Search Report—TW100130752—TIPO—Jul. 29, 2014.

3GPP TS 24.008 V9.3.0, Jun. 15, 2010, pp. 385-397, 482-494, Retrieved from Internet: URL: http://www.3gpp.org/ftp/Specs/archive/24_series/24.008/24008-930.zip.

* cited by examiner

WIRELESS COMMUNICATION SYSTEMS AND METHODS

CROSS REFERENCE TO RELATED APPLICATION & PRIORITY CLAIM

This application claims priority to and the benefit of U.S. Provisional Application No. 61/377,881, filed 27 Aug. 2010, which is incorporated herein by reference as if fully set forth below.

TECHNICAL FIELD

Embodiments of the present invention relate generally to wireless communication systems, and particularly to wireless communication systems including one or more network apparatus that can communicate with at least one mobile station in an interference environment.

BACKGROUND

In present wireless communication systems it is common for a mobile station (MS) to indicate to a network a set of communication modes it supports. For example in a network supporting the Global System for Mobile Communications (GSM) communication standards the mobile station can indicate that it supports GSM full-rate voice, GSM half-rate voice, GPRS and EDGE communication modes. The mobile station may also transmit an indication that it has advanced receiver capability. For example the mobile station may indicate that its receiver has Downlink Advanced Receiver Performance (DARP) phase 1 and/or or DARP phase 2 capability, each of which is an enhanced interference rejection capability. A receiver having DARP capability can receive and process a wanted signal in the presence of a much higher-level interfering signal than can a receiver that does not have DARP capability.

Indication of DARP capability is outlined in published specification having reference ETSI TS 24.008 V9.3.0 (2010-06) and titled "3rd Generation Partnership Project; Technical Specification Group Core Network and Terminals; Mobile radio interface Layer 3 specification; Core network protocols; Stage 3 (Release 9)", in section 10.5.1.7 entitled "Mobile Station Classmark 3." Details of the implementation of DARP are contained in specification having reference "ETSI TS145 015 V5.2.0 (2007-05)", and titled "Digital cellular telecommunication system (Phase 2+); Release independent Downlink Advanced Receiver Performance (DARP); Implementation guidelines (3GPP TS 45.015 version 5.2.0 Release 5)".

An indication of DARP capability is transmitted by a mobile station and received by a network apparatus of the wireless communication system. The network apparatus, when it receives the indication of DARP capability, treats the indication as indicating that the mobile station has the indicated DARP capability for all modes of the set of communication modes that the mobile station has indicated it supports.

A mobile station which does not have DARP capability for all the communication modes that it has indicated it supports does not indicate that it has DARP capability. The network will treat that mobile station as though it does not have advanced interference rejection capability for any communication mode. The network will treat the mobile station this way even when the mobile station has advanced interference rejection capability for some, but not all, communication modes which the mobile station supports. It is therefore desirable to provide a means for allowing the network to make use of an advanced interference rejection capability of a mobile station which has advanced interference rejection capability for some but not all communication modes which the mobile station supports. Such a wireless communication system is capable of providing increased actual communication capacity.

DARP Phase 3 is a proposed new specification of advanced receiver capability requirements that is more stringent than the DARP Phase 1 and 2 specifications. Current mobile stations do not have DARP Phase 3 capability. Manufacturers may choose to produce a mobile station which complies with the DARP Phase 3 specification for some but not all communication modes, for reasons of cost. For example, the mobile station may be configured to have DARP Phase 3 capability when it is receiving voice signals but not when it is receiving packet data in EDGE mode. It is therefore desirable to provide an improved wireless communication system that makes use of a mobile station's DARP Phase 3 capability when the mobile station has DARP Phase 3 capability for some but not all communication modes that it supports.

It should be understood that reference to a mobile station in this description may be taken as a reference to a remote communications terminal which may be fixed or mobile.

BRIEF SUMMARY OF EXEMPLARY EMBODIMENTS

Certain embodiments of the present invention are provided to address the above mentioned issues as well as others. Embodiments of the present invention may be implemented as network components, processing instructions used by network components, or some combination thereof. In addition, some embodiments of the present invention may be network-side based, operator-equipment based, end-user equipment, or a combination thereof. While exemplary embodiments of the present invention of the present invention are summarized below, the full scope is covered by the various claims provided below.

Certain embodiments of the application can include a wireless communication system in which a network apparatus communicates with at least one mobile station in an interference environment. The system can generally comprise a transmitter, a receiver, and a resource allocator. The transmitter can transmit data for indicating for the at least one mobile station a set of modes of communication in which the mobile station is capable of operating and for at least one mode of communication in the set an indication of interference rejection capability. The receiver can receive the indicating data. The resource allocator can be coupled to the receiver and be responsive to the received indicating data. This enables the resource allocator to allocate system resources during a connection between network apparatus and at least one mobile station. The allocation of system resources may depend on or more of the mode of communication of the connection, the indication of interference rejection capability of the mobile station for the mode of communication of the connection, and the interference environment expected during the connection.

Certain embodiments include a network apparatus for use in a wireless communication system in communicating with at least one mobile station in an interference environment. The network apparatus can generally comprise a receiver and a resource allocator. The receiver can receive data indicating for the at least one mobile station a set of modes of communication in which the mobile station is capable of operating and for at least one mode of communication in the set an indication of interference rejection capability. The resource allocator can be coupled to the receiver and be responsive to the received indicating data. This enables the resource allocator to allocate system resources for use during a connection between the network apparatus and the at least one mobile station. Allocating system resources may depend on or more of the mode of communication of the connection, the indication of interference rejection capability of the mobile station for the mode of communication of the connection, and the interference environment expected during the connection.

Other embodiments of the invention can include mobile stations for use in a wireless communication system. In such an embodiment, a network apparatus can communicate with the mobile station in an interference environment. The mobile station can generally comprise a transmitter. The transmitter can transmit data indicating a set of modes of communication in which the mobile station is capable of operating and for at least one mode of communication in the set an indication of interference rejection capability.

Some embodiments can include a method of allocating system resources for use in a wireless communication system. In such an arrangement, a network apparatus can communicate with at least one mobile station in an interference environment. The method can comprise transmitting data indicating, for the at least one mobile station, a set of modes of communication in which the mobile station is capable of operating and for at least one mode of communication in the set an indication of interference rejection capability and receiving the indicating data. The method can also include allocating data system resources for use during a connection between the network apparatus and the at least one mobile station. Allocation may be based on the received indicating data. For example, allocation of system resources may depend on the mode of communication of the connection, on the indication of interference rejection capability of the mobile station for the mode of communication of the connection, and on the interference environment expected during the connection.

Still yet other embodiments can include a network apparatus for use in a wireless communication system in which the network apparatus communicates with at least one mobile station in an interference environment. The network apparatus may generally comprise a processor and memory in electronic communication with the processor. Instructions can be stored in the memory, and the instructions can be executable by the processor. The instructions can instruct the processor to receive data indicating for the at least one mobile station a set of modes of communication in which the mobile station is capable of operating and for at least one mode of communication in the set an indication of interference rejection capability. The instructions may also instruct the processor to allocate data system resources for use during a connection between the network apparatus and the at least one mobile station. Allocation can be based on the received indicating data. Also, allocating of system resources may depend on the mode of communication of the connection, on the indication of interference rejection capability of the mobile station for the mode of communication of the connection, and on the interference environment expected during the connection.

Some embodiments can be implemented as a computer program product for use in a network apparatus of a wireless communication system in which the network apparatus communicates with at least one mobile station in an interference environment. Such a computer program product can comprise a computer-readable media comprising code for causing a computer to allocate in response to received indicating data system resources for use during a connection. The code can comprise instructions to receive data indicating for the at least one mobile station a set of modes of communication in which the mobile station is capable of operating and for at least one mode of communication in the set an indication of interference rejection capability. The code can also comprise instructions to allocate data system resources for use during a connection between the network apparatus and the at least one mobile station. Allocation may be based on the received indicating data. Allocation may also be based on the mode of communication of the connection, the indication of interference rejection capability of the mobile station for the mode of communication of the connection, and the interference environment expected during the connection.

Still yet other embodiments can include a mobile station for use in a wireless communication system in which a network apparatus communicates with the mobile station in an interference environment. The mobile station can comprise one or more processors and memory in electronic communication with the one or more processors. Processing instructions can be stored in the memory. The instructions can instruct the processor to transmit data indicating a set of modes of communication in which the mobile station is capable of operating and for at least one mode of communication in the set an indication of interference rejection capability.

Some embodiments can include a computer program product for use in a mobile station of a wireless communication in which a network apparatus communicates with the mobile station in an interference environment. The computer program product can comprise computer-readable media comprising code for causing a computer to transmit indicating data. The code can include instructions to transmit the indicating data to indicate a set of modes of communication in which the mobile station is capable of operating and for at least one mode of communication in the set an indication of interference rejection capability.

Still yet other embodiments can include a network apparatus for use in a wireless communication system for communicating with at least one mobile station in an interference environment. The network apparatus can comprise means for receiving data indicating for the at least one mobile station a set of modes of communication in which the mobile station is capable of operating and for at least one mode of communication in the set an indication of interference rejection capability; and means for allocating in response to the received indicating data system resources for use during a connection between the network apparatus and the at least one mobile station, the allocating of system resources depending on the mode of communication of the connection, on the indication of interference rejection capability of the mobile station for the mode of communication of the connection, and on the interference environment expected during the connection.

Still yet additional embodiments can include a mobile station for use in a wireless communication system in which a network apparatus communicates with the mobile station in an interference environment. The mobile station can comprise means for transmitting data indicating a set of modes of communication in which the mobile station is capable of operating and for at least one mode of communication in the set an indication of interference rejection capability.

Also, embodiments of the present invention can be utilized with a communications network comprising multiple communication components configured to communicate with at least one other communication component. For example, a communication device can comprise a processor and a transmitter. The processor can be configured to determine a set of communication modes in which the communication device is capable of operating and for at least one communication mode, determining an indication of interference rejection capability. The transmitter can be configured to communicate at least one of said set of communication modes or said interference rejection capability to at least one other communication component in said communications network.

DETAILED DESCRIPTION OF EXEMPLARY & ALTERNATIVE EMBODIMENTS

Figure 1:
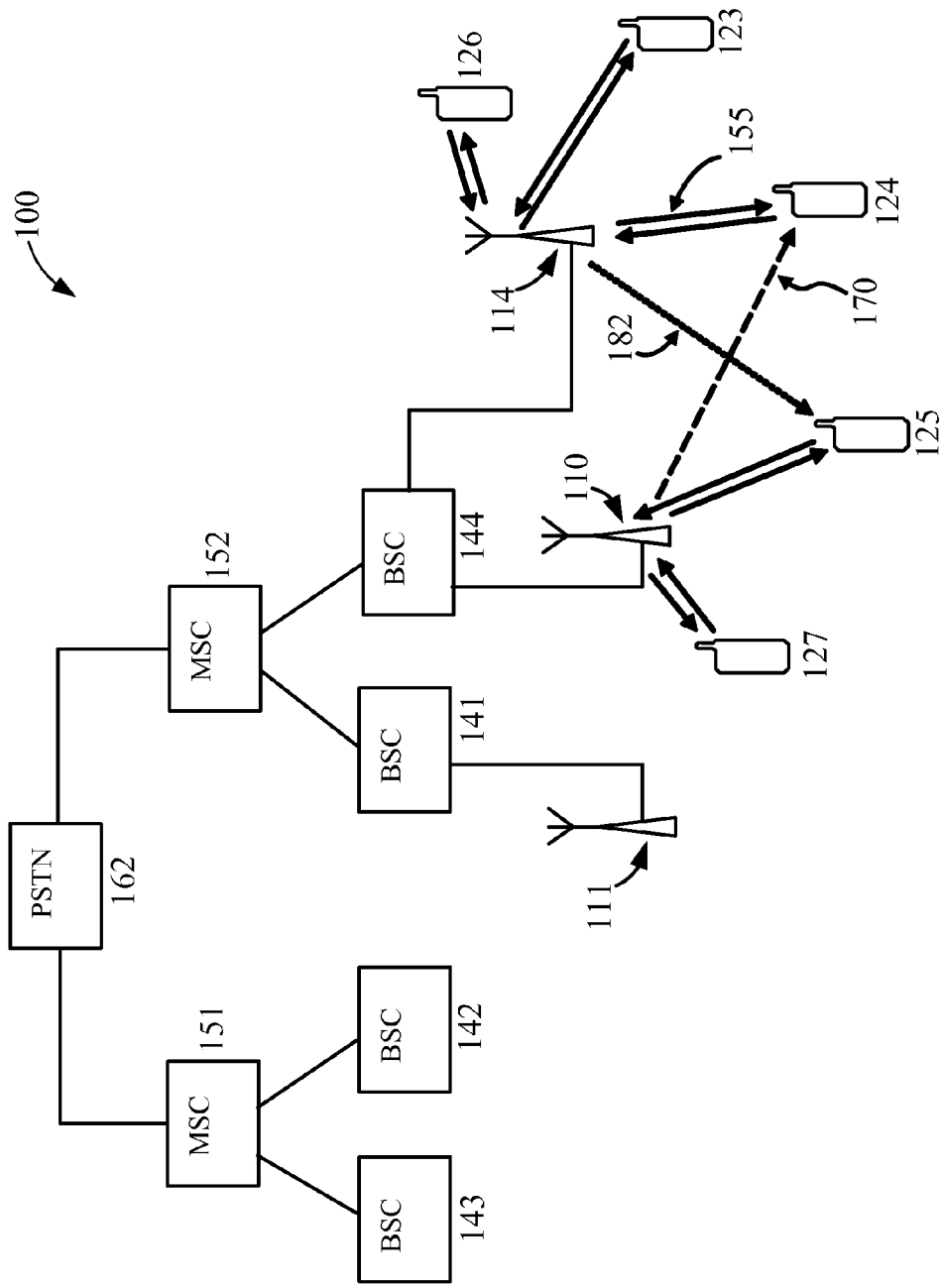
FIG. 1 is a schematic diagram illustrating elements of a wireless communication system in accordance with some embodiments of the present invention.

FIG. 1 is a schematic diagram illustrating elements of a wireless communication system 100. As further described below, the system 100 can include various components that can wirelessly communicate with one or more other network components. Thus each of the components can include one or more of transmitters, receivers, transceivers, circuitry, processors, controllers, processing instructions, and other desired features enabling wireless communication.

In the wireless communication system 100, transmitted data is multiplexed so as to allow a plurality of mobile stations 123-127 to communicate with a single base station 110, 111, 114. Examples of multiplexing techniques are frequency division multiple access (FDMA), and time division multiple access (TDMA).

Frequency division multiple access (FDMA) is a multiple access technique wherein each active connection is allocated a particular communication channel (physical channel) having a particular channel frequency for a downlink signal and a particular channel frequency for an uplink signal. The downlink signal is transmitted by a base station 110, 111, 114 of the network and received by a mobile station 123-127. The uplink signal is transmitted by a mobile station 123-127 and received by a base station 110, 111, 114. Base stations 110, 111, 114 and mobile stations 123-127 each have a transmitter and a receiver which are used to transmit and receive signals, respectively.

Time division multiple access (TDMA) is a multiple access technique which allows different users, i.e., mobile stations 123-127, to use a communication link during different intervals of time, commonly referred to as time slots. Such time slots may repeat in a regular pattern. For example, there may be eight consecutive time slots which repeat regularly.

According to a scheme known as frequency division duplex (FDD), the frequencies for downlink and uplink signals are different to each other. This is done to minimise interference between transmitted signals and received signals at either a mobile station 123-127 or a base station 110, 111, 114 and to allow simultaneous transmission and reception by one communication apparatus e.g. a mobile station 123-127.

Time-division duplex (TDD) is an access technique which allows transmit and receive operations in a communication apparatus (e.g. a base station 110, 111, 114 or a mobile station 123-127) to occur at different instances of time. This can reduce interference to received signals by transmitted signals.

The system 100 may have additional features. For example, the wireless communication system 100 can have all the above-mentioned features of TDMA, FDMA, FDD and TDD. In addition, the system 100 can be a cellular communication system in which each cell has a base station 110, 111, 114 and at least one mobile station 123-127 and communications signals can be relayed between mobile stations 123-127 in different cells by means of base stations 110, 111, 114. It should however be appreciated that various multiple access schemes, coding techniques and system configurations may be used other than, or in addition to, those described herein.

The wireless communication system 100 includes a network comprising base stations 110, 111, 114, base station controllers 141-144, and mobile switching centres 151, 152. The wireless communication system 100 also includes mobile stations 123-127 which are able to communicate with the base stations 110, 111, 114 via wireless links 155.

The base station controllers 141-144 act to route signals carrying data to and from different mobile stations 123-127 in the same cell or in different cells, under the control of the mobile switching centres 151, 152 via the base stations 110, 111 and 114. The mobile switching centres 151, 152 are connected to a public switched telephone network (PSTN) 162. Signals carrying data may be transferred between each of the mobile stations 123-127 and communications equipment of other communications networks via the public switched telephone network 162. The public switched telephone network 162 thus allows calls to be routed between the wireless communication system 100 and other communication systems. Such other communication systems include wired systems, fibre optic systems and other mobile cellular communication systems of different types and conforming to different standards.

Each of the mobile stations 123-127 can be serviced by any one of a number of base stations 110, 111, 114. A mobile station 124 receives both a signal transmitted by a serving base station 114 and signals transmitted by nearby non-serving base stations 110, 111 and intended to serve other mobile stations 125, 127. The signals transmitted by non-serving base stations 110, 111 therefore act as interference at the receiver of the mobile station 124 served by base station 114.

The strengths of the different signals from base stations 110, 111, 114 are periodically measured by mobile station 124 served by base station 114, and reported to a base station controller 144. Base stations 110, 111 in adjacent cells typically transmit signals using different sets of communication channels to those used by base station 114. Mobile station 125 monitors the signals from its non-serving base stations 110, 111.

If the signal from a nearby base station 110, 111 on one channel becomes stronger than that of the serving base station 114 on another channel, then the mobile switching centre (MSC) 152 will usually act to make the nearby base station 110, 111 become the serving base station and to make the serving base station 114 become a non-serving base station. The MSC 152 thus performs a handover of the mobile station to the nearby base station 110.

Handover may also occur when two signals transmitted on the same channel by two respective base stations in non-adjacent cells are received at similar amplitudes by a mobile station. One of the signals is intended for the mobile station (the wanted signal) and the other signal is intended for a different mobile station and acts at the mobile station as interference to the wanted signal. If the mobile station cannot receive and decode the wanted signal in the presence of the interfering signal, the network will perform a handover to allocate another channel to the mobile station. The process of handover reduces the actual capacity of the network because handover involves signalling between the network and the mobile station and the signalling uses communication bandwidth. It is therefore desirable to minimise the number of handovers.

A handover of the mobile station can be delayed or avoided in situations where the interference environment at the receiver is severe or adverse for the purposes of receiving the wanted signal but the mobile station is known to have advanced interference rejection capability. Such advanced interference rejection capability allows the receiver to still receive and decode the signal from the serving base station even though the interference is severe or adverse. If the network knows that the mobile station has advanced receiver capability the network can transmit a higher level of interfering signal and can avoid or delay the handover. If fewer handovers occur, the communication system can operate more efficiently.

The MSC 152 of the network may decide whether to perform a handover of a mobile station 123-127 based on power levels reported by the mobile station 123-127 for signals received by the mobile station 123-127 and based on a receiver capability of the mobile station 123-127, in particular a noise and interference rejection capability. The MSC has knowledge of the receiver capability of a mobile station 123-127 that has transmitted a signal comprising an indication of its receiver capability. The mobile station 124 also periodically transmits a signal indicating received signal quality and/or power level of a signal it receives from the base station 110. For example the mobile station 124 may periodically transmit the signal to indicate a receive quality parameter RX QUAL and/or a bit error probability (BEP) which each have values that depend on signal-to-noise-and-interference ratio (SNIR) of the signal received by the mobile station 124. The MSC 152 may operate so that it performs a handover only when the mobile station 124 has indicated a received signal quality which is below a prescribed threshold, and importantly the MSC 152 may be configured to use a lower threshold for a mobile station 124 having advanced interference rejection capability such as DARP. This is because the mobile station 124 having DARP can tolerate a higher level of interference at the input to its receiver, as mentioned above.

Figure 2:
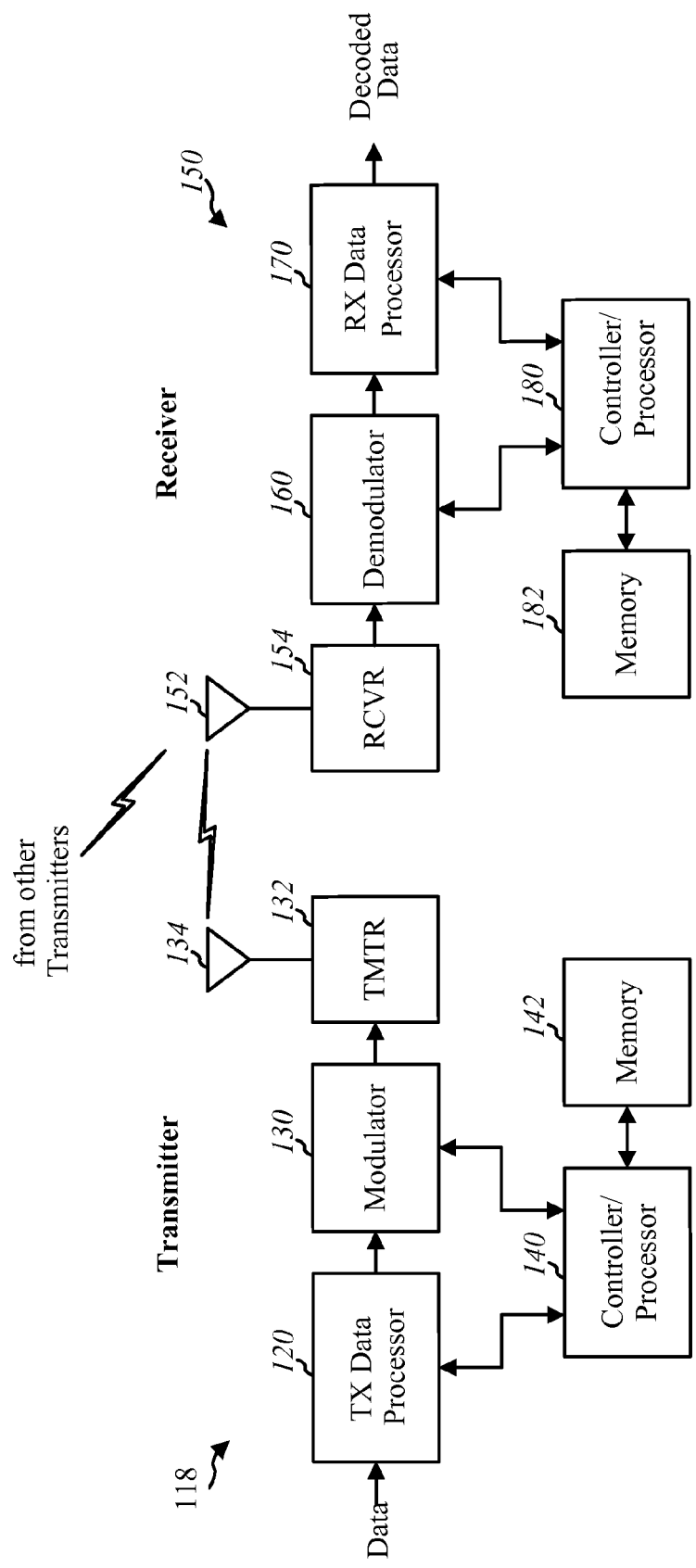
FIG. 2 is a schematic diagram of a transmitter and a receiver of the wireless communication system of FIG. 1 in accordance with some embodiments of the present invention.

FIG. 2 of the accompanying drawings is a schematic diagram of a transmitter 118 and a receiver 150 of the wireless communication system 100 of FIG. 1. For the downlink, the transmitter 118 may be part of a base station 110, 111, 114 and the receiver 150 may be part of a mobile station 123-127. For the uplink, the transmitter 118 may be part of a mobile station 123-127, and the receiver 150 may be part of a base station 110, 111, 114. The transmitter 118 is used to transmit traffic data and signalling data which may include data indicating a receiver capability. Although FIG. 2 shows the network components containing a receiver and a transmitter, the network components may include transceivers (i.e., combined receiver and transmitter circuitry).

At the transmitter 118, a transmit data processor 120 receives and processes (e.g., formats, encodes, and interleaves) data and provides coded data. A modulator 130 performs modulation on the coded data and provides a modulated signal. A transmitter unit 132 conditions (e.g., filters, amplifies, and up converts) the modulated signal and generates an RF modulated signal, which is transmitted via an antenna 134.

At the receiver 150, an antenna 152 receives the transmitted RF modulated signal from transmitter 118 together with transmitted RF modulated signals from other transmitters. The antenna 152 provides a received RF signal to a receiver unit 154. The receiver unit 154 conditions (e.g., filters, amplifies, and down converts) the received RF signal, digitizes the conditioned signal, and provides samples. A demodulator 160 processes the samples and provides demodulated data. A receive data processor 170 processes (e.g., de-interleaves and decodes) the demodulated data and provides decoded data. In general, the processing by demodulator 160 and receive data processor 170 is complementary to the processing by modulator 130 and transmit data processor 120, respectively, at transmitter 110.

Controllers/processors 140 and 180 control operations at transmitter 118 and receiver 150, respectively. Memories 142 and 182 store program codes in the form of computer software, and data used by transmitter 118 and receiver 150 respectively.

Figure 3:
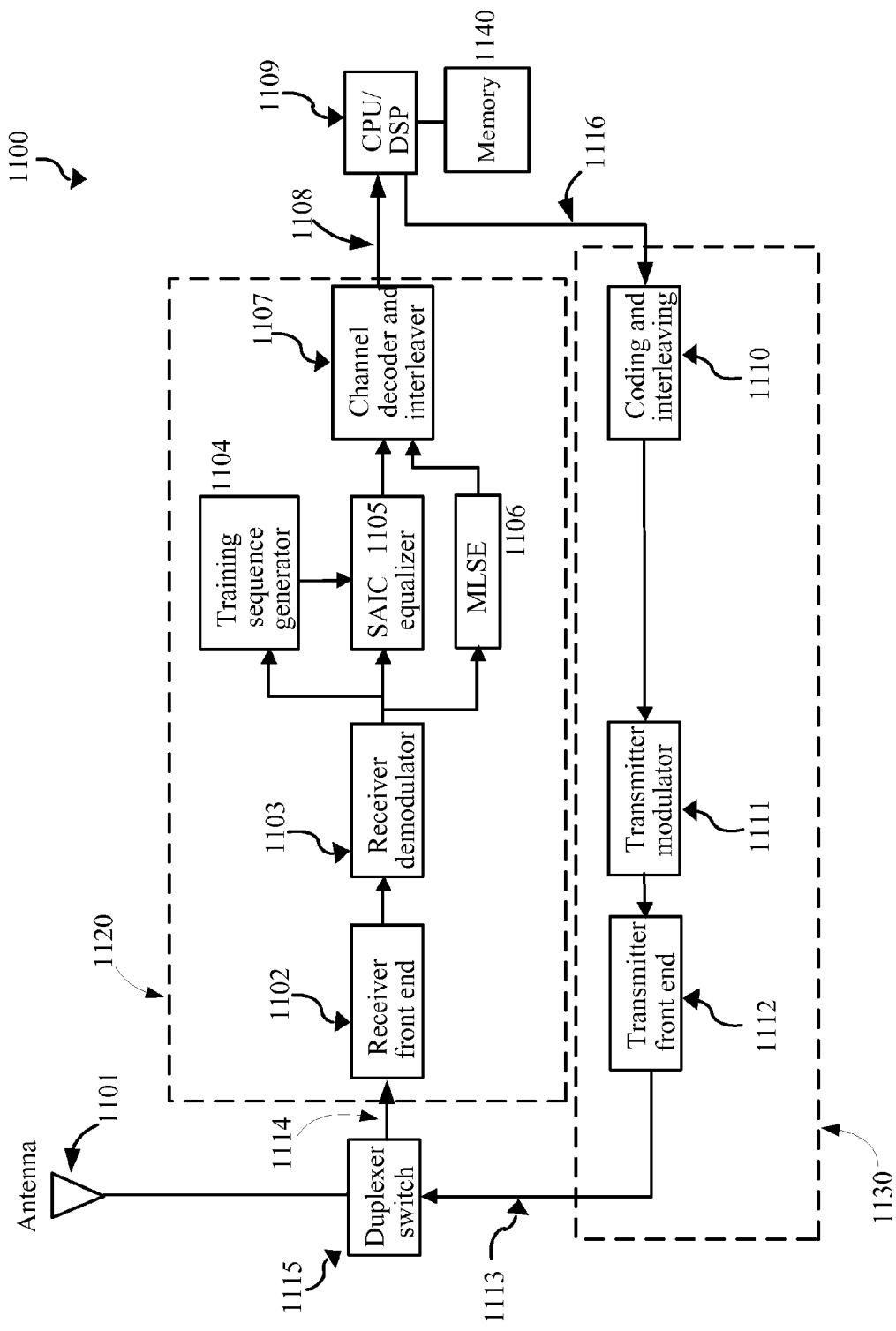
FIG. 3 is a schematic diagram illustrating a transceiver including a receiver having enhanced interference rejection capability in accordance with some embodiments of the present invention.

FIG. 3 of the accompanying drawings is a schematic diagram illustrating a transceiver 1100 including a receiver 1120 having enhanced interference rejection capability. The transceiver 1100 could be part of a mobile station 123-127 or it could equally well be part of a base station 110, 111, 114. A signal comprising data is provided by means of antenna 1101 and duplexer switch 1115 to a receiver front end 1102. The receiver front end 1102 serves to filter, amplify and down convert the signal to produce a down converted signal. A demodulator 1103 serves to demodulate the down converted signal to produce a demodulated signal.

The receiver 1120 comprises a single antenna interference cancellation (SAIC) equalizer 1105 and a maximum likelihood sequence estimator (MLSE) equalizer 1106. The receiver 1120 is adapted to use either the single antenna interference cancellation (SAIC) equalizer 1105, or the maximum likelihood sequence estimator (MLSE) equalizer 1106 under the control of a central processing unit (CPU) 1109 and according to instructions stored in a memory 1140 coupled to the CPU 1109. The SAIC equalizer 1105 is preferred for use when two signals having similar amplitudes are received. The MLSE equalizer 1106 is typically used when the amplitudes of the received signals are not similar, for example when the wanted signal has an amplitude much greater than that of an unwanted co-channel signal.

The SAIC equalizer 1105 and the MLSE equalizer 1106 are each configured to perform channel estimation and equalization of the demodulated signal to produce an equalized signal, using training sequences produced by a training sequence generator 1104. The equalized signal is fed to a channel decoder and interleaver 1107 which serves to decode and de-interleave the equalized signal to produce decoded and de-interleaved data. The decoded and de-interleaved data is output to the CPU 1109.

The operations of the antenna 1101, duplexer switch 1115, receiver front end 1102, receiver demodulator 1103, single antenna interference cancellation (SAIC) equalizer 1105, MLSE equalizer 1106, training sequence generator 1104, and channel decoder and interleaver 1107 are known and need not be described in any further detail.

Data 1116 to be transmitted by the transceiver 1100 is coded and interleaved by a coding and interleaving unit 1110 to produce coded and interleaved data. The coded and interleaved data is input to a modulator 1111 which serves to modulate the coded and interleaved data to produce modulated data. A transmitter front end 1112 is configured to filter, amplify and up convert the modulated data to produce transmit data. The transmit data is transmitted via the duplexer switch 1115 and the antenna 1101. The operations of the coding and interleaving unit 1110, the modulator 1111 and the transmitter front end 1112 are known and need not be described in further detail. The data 1116 to be transmitted by the transceiver 1100 may include data indicating a receiver capability.

The capability of a receiver (e.g., receiver 1120) to receive a wanted signal in the presence of interfering signals may be specified as an interference rejection capability. An example of a specified interference rejection capability is the DARP capability mentioned above and specified by the GSM standards, also mentioned above. The mobile station 123-127 is configured to transmit a signal indicating its receiver capability. If the mobile station 123-127 is DARP-capable, it will indicate that it has the DARP capability. The mobile station 123-127 may have DARP capability or it may have an interference capability which is less than that provided by DARP.

Figure 4:
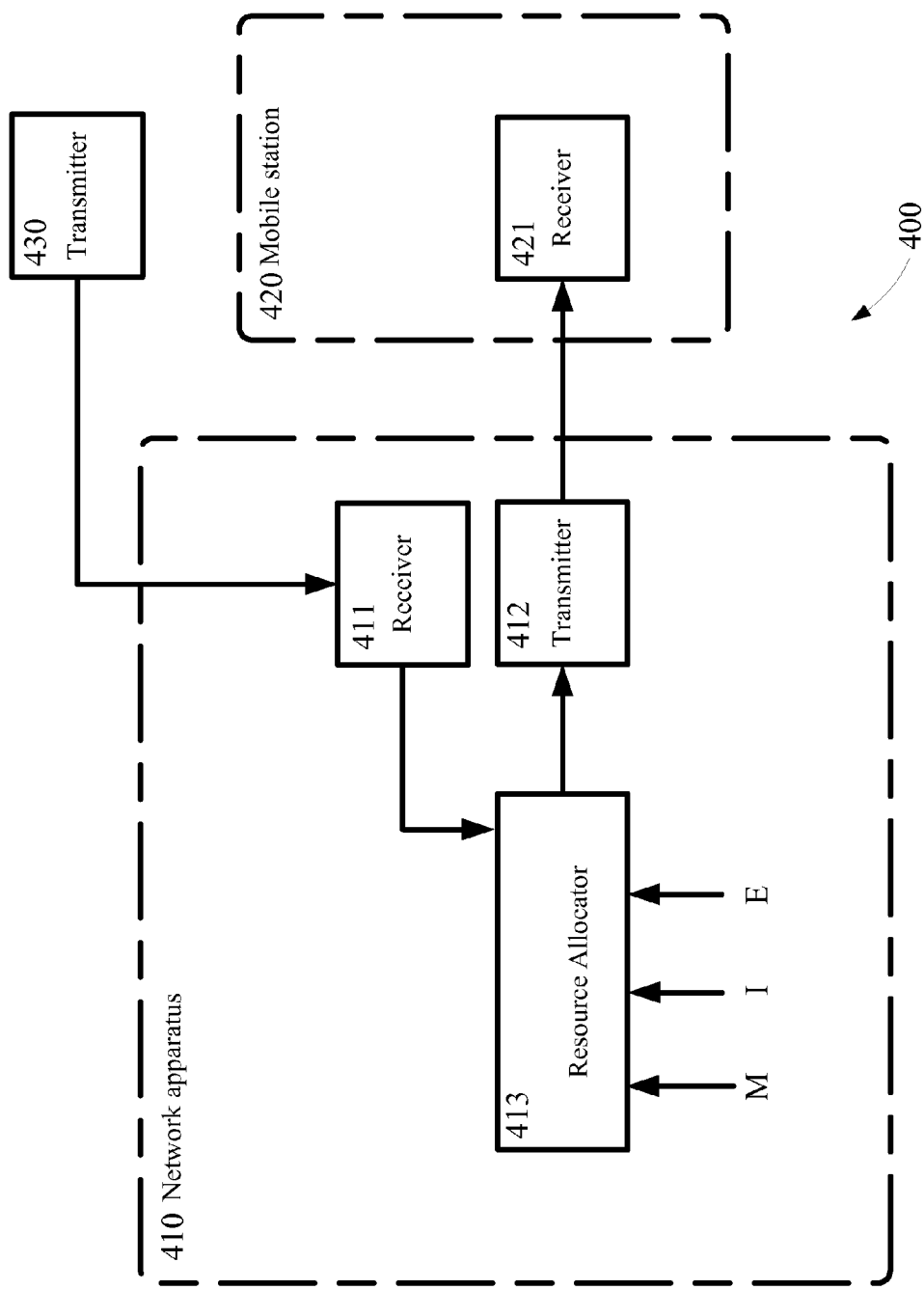
FIG. 4 is a schematic diagram of a wireless communication system comprising a network apparatus, a mobile station and a transmitter in accordance with some embodiments of the present invention.

FIG. 4 of the accompanying drawings is a schematic diagram of a wireless communication system 400 comprising a network apparatus 410, a mobile station 420 and a transmitter 430. These components are more fully discussed below.

The network apparatus 410 includes a receiver 411 and a transmitter 412. The mobile station 420 includes a receiver 421. Signals transmitted by the network apparatus's 410 transmitter 412 may be received by the mobile station's 420 receiver 421. The signals may be transmitted and received via one or more antennas (not shown) over a wireless link to provide a connection between the network apparatus 410 and the mobile station 420. As described above in relation to FIG. 1, it should be understood that a signal transmitted wirelessly by the network apparatus 410 will be transmitted in different directions and may be received by more than one mobile station 420. Also, each mobile station 420 may receive multiple signals transmitted by plural network apparatus 410.

The transmitter 430 serves to transmit a signal comprising indicating data. The indicating data serves to indicate for the mobile station 420 a set of modes of communication in which the mobile station 420 is capable of operating. The indicating data also serves to indicate an interference rejection capability of the mobile station 420 for at least one mode of the set of modes of communication in which the mobile station 420 is capable of operating. The indicating data is typically transmitted in the form of signalling data.

A resource allocator 413 within the network apparatus 410 and coupled to the receiver 411 of the network apparatus 410 responds to the received indicating data by allocating system resources for use during a connection between the network apparatus 410 and the mobile station 420. The allocation of system resources is dependent on the mode of communication M of the connection, on the indicated interference rejection capability I of the mobile station 420 for that mode of communication, and on an interference environment E expected to exist during the connection. A more detailed example of the wireless communication system 400 will now be described.

Figure 5:
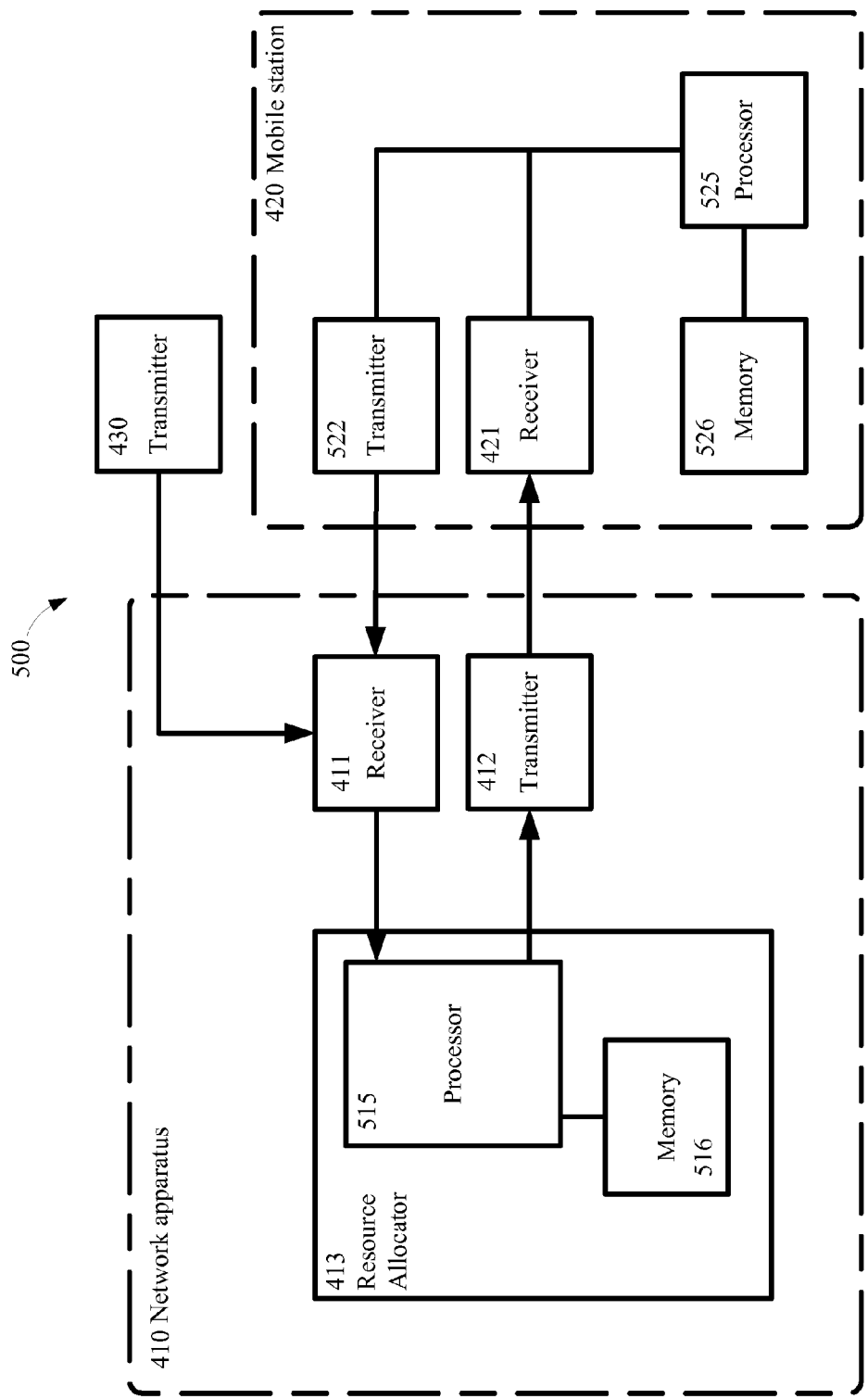
FIG. 5 is a schematic diagram of another wireless communication system comprising a network apparatus, a mobile station, and a transmitter in accordance with some embodiments of the present invention.

FIG. 5 of the accompanying drawings is a schematic diagram of another wireless communication system 500 comprising a network apparatus 410, a mobile station 420 and a transmitter 430.

The network apparatus 410 comprises a receiver 411, a transmitter 412 and a resource allocator 413. The resource allocator 413 comprises a processor 515 and a memory 516 in communication with the processor 515. The processor 515 controls operation of the receiver 411 and the transmitter 412 of the network apparatus 410 and is operable to allocate resources for use during a connection between the network apparatus 410 and the mobile station 420 as described below. The operations of the receiver 411 and transmitter 412 of the network apparatus 410 shown in FIG. 5 are similar to the operations of the respective receiver 411 and transmitter 412 of the network apparatus 410 shown in FIG. 4.

The mobile station 420 comprises a receiver 421, a transmitter 522, a processor 525 and a memory 526 in communication with the processor 525. The operation of the receiver 421 of the remote station 420 shown in FIG. 5 is similar to the operation of the receiver 421 of the remote station 420 shown in FIG. 4. The operation of the transmitter 430 of FIG. 5 is similar to the operation of the transmitter 430 of FIG. 4. The principles of operation of the elements of the network apparatus 410 and the elements of the mobile station 420 will be described in further detail below.

The network apparatus 410 typically forms part of a base station 110, 111, 114. The transmitter 430 may form part of the mobile station 420 or it may be external to the mobile station 420 as shown in FIGS. 4 and 5. For example the network apparatus 410 may include the transmitter 430 and the indicating data may originate from the BSC 144 or the MSC 152. The transmitter 430 may transmit the indicating data as signalling data and may transmit the indicating data either wirelessly or over a wired link. If the transmitter 430 forms part of the mobile station 420, the transmitter 430 may be the same element as the transmitter 522 of the mobile station 420, in which case the transmitter 430, 522 of the mobile station serves to transmit the indicating data and also to transmit traffic data and signalling data other than the indicating data.

If the transmitter 430 is part of the network but is not part of the mobile station 420 then the transmitter 430 transmits indicating data for the mobile station 420 and for all other mobile stations 420 in the same cell as the mobile station 420 and served by the same network apparatus 410. If, alternatively, the transmitter 430 is a part of the mobile station 420 then the transmitter 430 transmits indicating data for only the mobile station 420. The transmitter 430 may retrieve stored indicating data relating to the mobile station 420 and then transmit the indicating data. The receiver 411 of the network apparatus 410 receives the indicating data transmitted by the transmitter 430. If the transmitter 430 is not part of the mobile station 420 then the transmitter 430 transmits stored indicating data for all mobile stations served by the same cell as the mobile station 420.

The processor 515 of the resource allocator 413 acts to allocate system resources based on the mode of communication M for the connection, the interference rejection capability I and the expected interference environment E, each mentioned above. Data relating to the mode M, interference rejection capability I and expected interference environment E are stored in the memory 516 and are each derived from part of the indicating data transmitted by the transmitter 430 and received by the receiver 411 of the network apparatus 410, as described above for FIG. 4. The operation of the elements of the wireless communication system 500 as they relate to the mode of communication M for the connection, the interference rejection capability I and the expected interference environment E will now be explained.

The network apparatus 410 identifies the mode of communication M for the connection based on calling data it receives. The network apparatus may receive the calling data at its receiver 411 for example if the calling data is transmitted by the transmitter 522 of the mobile station 420. The calling data may originate from an entity other than the remote station, for example the MSC 114, in which case the calling data is transmitted to the network apparatus 410 via a network interconnection (not shown in FIG. 4 or 5) between the network apparatus 410 and the MSC 152. An example of such a network interconnection is shown in FIG. 1 as the lines joining MSC 152 to BSC 144 and joining BSC 144 to base station 114, the base station 114 comprising the network apparatus 410 in this example.

The resource allocator 413 may determine the expected interference environment E based on reports transmitted by the mobile station 420 and including data indicating a received signal quality e.g. a received signal quality indicator (e.g. RX QUAL) or a bit error probability (BEP) based on measurements of received signal quality at the mobile station 420. Such measurements contribute to providing a measurement of interference at the receiver 421 of the mobile station 420. The actual measurement of the interference would be performed in the mobile station 420 but the serving base station 114 will make use of this information to adapt the downlink (from the base station 114 to mobile station 124, 420) to overcome the interference. The network apparatus 410 of the serving base station 114 contributes to the adapting of the downlink by allocating system resources as described herein.

Alternatively the network may determine the expected interference environment E for the receiver 421 of the mobile station 420, 124 based on parameters associated with signals received by the serving base station 114. One such parameter is a received signal quality parameter which depends on received signal quality of a signal received by the serving base station 114 and transmitted by the mobile station 420, 124. Another such parameter is power levels measured by the serving base station 114 for signals received by the serving base station 114 and transmitted by the mobile station 420, 124 and by other mobile stations 123, 125, 126, 127. Yet another parameter is the measured bit error probability (BEP) of a signal received by the serving base station 114 and transmitted by the mobile station 420, 124. The interference environment at the serving base station's 114 receiver tends to be adverse when the interference environment at the mobile station's 420, 124 receiver 421 is adverse. The MSC 152 may use one or more of the received signal quality parameter, the measured power levels, the bit error probability and the interference environment at the serving base station's 114 receiver to determine the expected interference environment E which would exist at the mobile station's 420, 124 receiver 421 if the system resources were allocated for the connection.

An expected interference environment E may be determined by the network apparatus 410. For example the resource allocator 413 of the network apparatus 410 may determine the expected interference environment E based on power data transmitted by the mobile station 420 and received by receiver 411 of the network apparatus, the power data indicating power levels of signals received by the mobile station 420. The indicated power levels typically include power levels of interfering signals transmitted by base stations 110, 111 other than the serving base station 114 and received by the mobile station 420.

Alternatively an expected interference environment E may be determined by some other element of the network in regular communication with the network apparatus 410, for example the BSC 144 or the MSC 152. The network apparatus 410 may receive data representing the expected interference environment E from the other element via a wired or wireless connection. The network apparatus 410 may receive the data representing the expected interference environment E directly from the mobile station 420 which may comprise means for calculating the expected interference environment E based on the levels of the mobile station's 420 received signals and/or on a received signal quality parameter for the mobile station's wanted received signal.

The memory 516 stores the indicating data transmitted by the transmitter 430 and received by the receiver 411 as mentioned above. That is to say, the receiver 411 stores data representing the set of modes of communication in which the mobile station 420 is capable of operating and stores data representing the interference rejection capability I of the mobile station 420 for one or more of that set of modes. The memory 516 also stores the data representing the mode of communication M for the connection and the data representing the expected interference environment E. The expected interference environment E is expected to exist at the receiver 421 of the mobile station 420 when a connection is established between the network apparatus 410 and the mobile station 420.

The processor 515 of the resource allocator 413 acts according to instructions stored in the memory 516 so as to allocate system resources for use during the connection between the network apparatus 410 and the mobile station 420. The allocation of system resources is dependent on the stored mode of communication M of the connection, on the stored indicated interference rejection capability I of the mobile station 420 for that mode of communication, and on the stored interference environment E expected to exist during the connection. The processor 515 is coupled to, and controls the operation of, the receiver 411 and the transmitter 412 of the network apparatus 410 according to instructions contained in the memory 516.

The mobile station 420 comprises a receiver 421, a transmitter 522, a memory 526 and a processor 525 coupled to the memory 526. The processor 525 of the mobile station is coupled to, and acts to control operation of, the transmitter 522 and the receiver 421 according to instructions contained in the memory 526. If the transmitter 430 is part of the mobile station 420 then the processor 525 acts also to control the operation of the transmitter 430, 522.

The receiver 421 of the mobile station is configured to receive signals transmitted by the transmitter 412 of the network apparatus 410 on the downlink. The transmitter 522 of the mobile station is configured to transmit signals on an uplink, these signals being received by the receiver 411 of the network apparatus 410. The downlink and uplink together serve to provide a two-way connection between the network apparatus 410 and the mobile station 420. Traffic and signalling data are communicated between the network apparatus 410 and the mobile station 420 via the connection. It should be understood that the connection may be one-way (from the network apparatus 410 to the mobile station 420—see FIG. 4) or two-way as described above.

Figure 6:
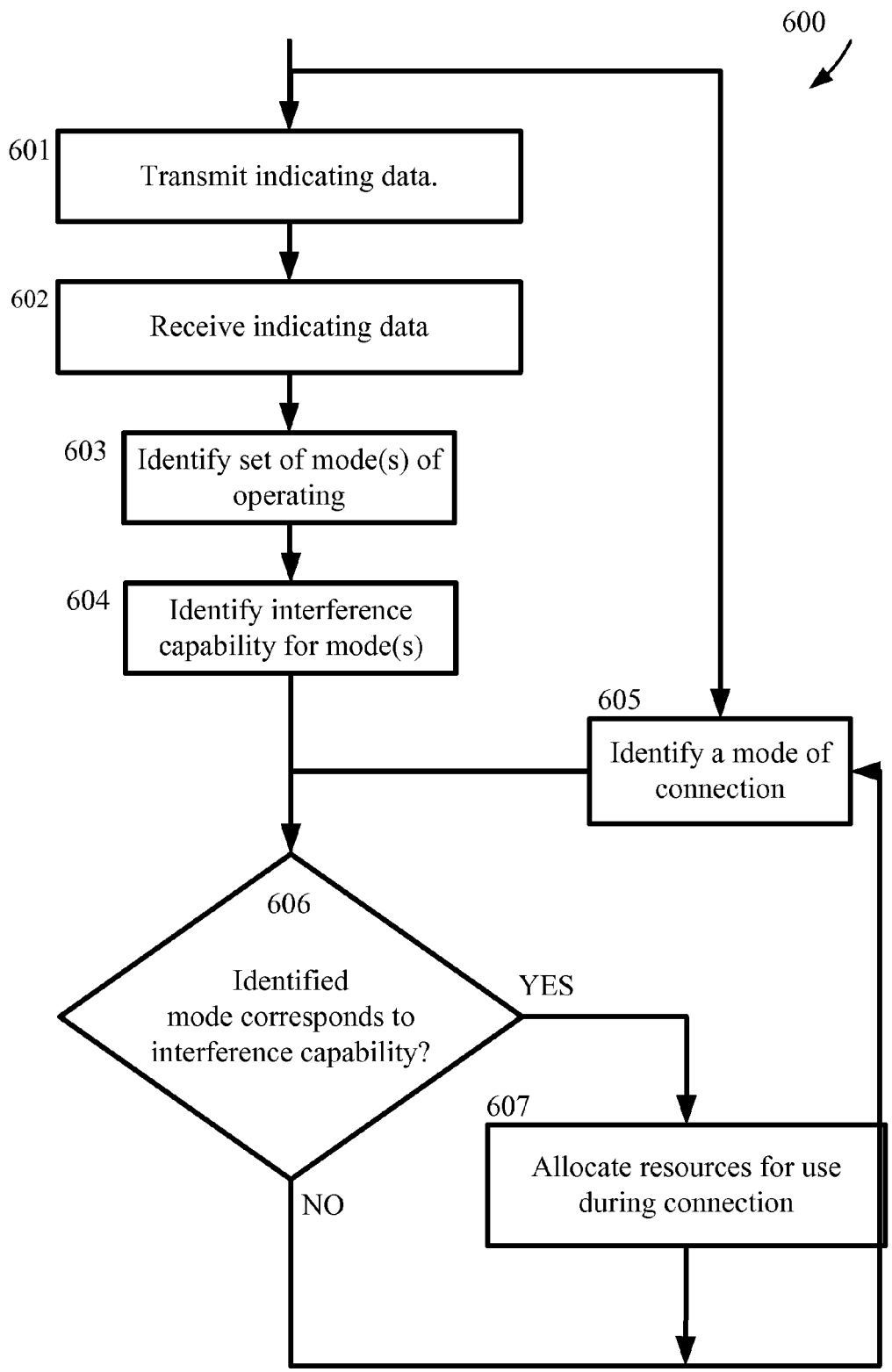
FIG. 6 is a flow diagram illustrating a procedure for allocating system resources during a connection in accordance with some embodiments of the present invention.

FIG. 6 of the accompanying drawings is a flow diagram illustrating a procedure 600 for allocating system resources during a connection between a network apparatus 410 and a mobile station 420. The procedure 600 is carried out primarily in the resource allocator 413 shown in FIG. 5.

In block 601 indicating data is transmitted. The indicating data serves to indicate (a) a set of modes of communication in which a mobile station 420 is capable of operating and (b) an indication of interference rejection capability I for at least one mode of the set of modes of communication in which a mobile station 420 is capable of operating. The indicating data is transmitted by the transmitter 430 shown in FIGS. 4 and 5.

In block 602 the indicating data is received by the receiver 411 of the network apparatus 410. In block 603 the set of modes is identified by the processor 515 of the network apparatus 410 based on the part of the received indicating data that relates to the set of modes. In block 604 the interference rejection capability or capabilities I is/are identified, each capability I being for one of the set of modes. The identification of the interference rejection capability I is performed by the processor 515 of the network apparatus 410 based on the part of the received indicating data that relates to the interference rejection capability I.

In block 605 a mode of communication M for a connection between a network apparatus 410 and the mobile station 420 is identified. For example the identified communication mode M may be one of five possible communication modes. The identified communication mode M is suitable for transmitting a signal to the particular mobile station 420 to provide a required type of service. The required type of service could be voice or internet data for example. The communication mode M may be a communication mode required for a service requested by a calling party. The network apparatus 410 identifies the mode of communication M for the connection based on calling data that it receives as described above in relation to FIG. 5.

In block 606 a determination is performed. The determination is based on the identified mode of communication M of the connection, on the indicated interference rejection capability I of the mobile station 420 for that mode of communication, and on the interference environment E expected to exist during the connection. The determination is performed by the processor 515 of the resource allocator 413 according to data and instructions stored in the memory 516 of the resource allocator 413, the stored data relating to the identified mode of communication M of the connection, to the indicated interference rejection capability I of the mobile station 420 for that mode of communication, and to the expected interference environment E.

Preferably the determination is performed so as to determine whether the identified interference rejection capability I of the mobile station is suitable for the mobile station 420 to use the identified mode of communication M during the connection when the mobile station 420 is in the expected interference environment E. That is, the determination serves to establish whether the interference rejection capability I of the mobile station 420 and the identified mode of communication M are together suitable for the mobile station 420 to use during the connection when the mobile station's 420 receiver 421 is in the expected interference environment E.

Therefore the resource allocator allocates system resources for use during the connection when the expected interference environment is adverse i.e. severe and the indicated interference rejection capability of the mobile station for the mode of communication of the connection is suitable for the adverse interference environment. Conversely the resource allocator allocates no system resources for use during the connection when the expected interference environment is adverse i.e. severe and the indicated interference rejection capability of the mobile station for the mode of communication of the connection is not suitable for the adverse interference environment.

If the determination in block 606 is positive (YES) then in block 607 system resources are allocated by the processor 515 of the resource allocator 413 for use during the connection between the network apparatus 410 and the mobile station 420. If the determination is negative (NO), the interference rejection capability of the mobile station is not suitable, no system resources are allocated for use during the connection. When the determination is negative, optionally in block 605 a new mode M is identified for the connection, or a mode M is identified for a new connection, if the existing connection is not implemented or established due to the determination. A new mode M may be thus identified, or a mode M may be thus identified for a new connection, based on new received calling data which originates from a calling party for example.

According to one example (option 1) the indicating data may comprise plural bits of information, for example three bits, which together indicate an interference rejection capability for some or all modes of the set of communication modes in which the mobile station is capable of operating. Different combinations of three bits are used in option 1 to indicate an interference rejection capability for different respective subsets of the set of communication modes. In this example the interference rejection capability is DARP Phase 3 capability and the set of communication modes is voice channels, GPRS, EGPRS, EGPRS2-A and EGPRS2-B. It should be understood that the interference rejection capability could be a type of receiver capability other than DARP Phase 3 capability.

Option 1:

A bit pattern defines for which modes of operation DARP Phase 3 is supported. With this option DARP Phase 3 support is hierarchical and 3 bits are used always even if a mobile indicates it does not support DARP Phase 3 capability.

<DARP Phase 3 capability: bit (3)>

The definition of the bit pattern is as follows.

DARP Phase 3 capability (3 bit field): this field indicates the DARP Phase 3 capability of the MS. It is coded as follows:

| Bits 321 | Indication |
|---|---|
| 000 | DARP Phase 3 not supported |
| 001 | DARP Phase 3 supported for voice channels |
| 010 | DARP Phase 3 supported for voice channels and GPRS |
| 011 | DARP Phase 3 supported for voice channels, GPRS and EGPRS |
| 100 | DARP Phase 3 supported for voice channels, GPRS, EGPRS and EGPRS2-A |
| 101 | DARP Phase 3 supported for voice channels, GPRS, EGPRS, EGPRS2-A, EGPRS2-B |
| 110 | Reserved. Mobile station shall not use this value. If received by the network it shall be interpreted as 1 0 1 |
| 111 | Reserved. Mobile station shall not use this value. If received by the network it shall be interpreted as 1 0 1 |

According to another example (option 2) the transmitter may be configured to transmit the indicating data so that the indicating data comprises individual bits of information, each individual bit indicating an interference rejection capability for a respective mode of communication.

Option 2:

A single bit indicating support for DARP Phase 3 for each mode of operation. This coding allows DARP Phase 3 capability indication for each mode of operation independently. The disadvantage is that it uses 5 bits to convey the capability, even if the mobile does not support DARP Phase 3 for any mode of operation.

< DARP Phase 3 capability for voice channels: bit >
< DARP Phase 3 capability for GPRS: bit >
< DARP Phase 3 capability for EGPRS: bit >
< DARP Phase 3 capability for EGPRS2-A: bit >
< DARP Phase 3 capability for EGPRS2-B: bit >

The definition of each of these capabilities is as follows.

DARP Phase 3 capability for voice channels (1 bit field)
This field indicates the DARP Phase 3 capability of the MS for voice channels. It is coded as follows:

| Bit | |
|---|---|
| 0 | DARP Phase 3 not supported for voice channels |
| 1 | DARP Phase 3 supported for voice channels |

DARP Phase 3 capability for GPRS (1 bit field)
This field indicates the DARP Phase 3 capability of the MS GPRS. It is coded as follows:

| Bit | |
|---|---|
| 0 | DARP Phase 3 not supported for GPRS |
| 1 | DARP Phase 3 supported for GPRS |

DARP Phase 3 capability for EGPRS (1 bit field)
This field indicates the DARP Phase 3 capability of the MS EGPRS. It is coded as follows:

| Bit | |
|---|---|
| 0 | DARP Phase 3 not supported for EGPRS |
| 1 | DARP Phase 3 supported for EGPRS |

DARP Phase 3 capability for EGPRS2-A (1 bit field)
This field indicates the DARP Phase 3 capability of the MS EGPRS2-A. It is coded as follows:

| Bit | |
|---|---|
| 0 | DARP Phase 3 not supported for EGPRS2-A |
| 1 | DARP Phase 3 supported for EGPRS2-A |

DARP Phase 3 capability for EGPRS2-B (1 bit field)
This field indicates the DARP Phase 3 capability of the MS EGPRS2-B. It is coded as follows:

| Bit | |
|---|---|
| 0 | DARP Phase 3 not supported for EGPRS2-B |
| 1 | DARP Phase 3 supported for EGPRS2-B |

According to another example (option 3), a single bit may be used in combination with the plural bits described above, the single bit serving to indicate whether the mobile station has, or does not have, an advanced interference capability for any mode of operation.

Option 3:
This option is similar to option 1 except it only uses one bit if the mobile station does not support DARP Phase 3 for any mode of operation. A bit pattern defines for which modes of operation DARP Phase 3 is supported. With this option DARP Phase 3 support is hierarchical.

{0|1<DARP Phase 3 capability: bit (3)>}
The definition of the bit pattern is as follows.
DARP Phase 3 capability (3 bit field)
If this field is not present then mobile station does not support DARP Phase 3 for any mode of operation.
If this field is present it indicates the DARP Phase 3 capability of the MS. It is coded as follows:

| Bits 3 2 1 | Indication |
|---|---|
| 0 0 0 | DARP Phase 3 supported for voice channels |
| 0 0 1 | DARP Phase 3 supported for voice channels and GPRS |
| 0 1 0 | DARP Phase 3 supported for voice channels, GPRS and EGPRS |
| 0 1 1 | DARP Phase 3 supported for voice channels, GPRS, EGPRS and EGPRS2-A |
| 1 0 0 | DARP Phase 3 supported for voice channels, GPRS, EGPRS, EGPRS2-A and EGPRS2-B |
| 1 0 1 | Reserved. Mobile station shall not use this value. If received by the network it shall be interpreted as 1 0 0 |
| 1 1 0 | Reserved. Mobile station shall not use this value. If received by the network it shall be interpreted as 1 0 0 |
| 1 1 1 | Reserved. Mobile station shall not use this value. If received by the network it shall be interpreted as 1 0 0 |

According to another example (option 4), a single bit can be used in combination with individual bits as follows:

Option 4:
This option is similar to Option 2 but it allows signalling of no DARP Phase 3 capability for any mode using a single bit. Otherwise, this coding has the same flexibility as option 2. The disadvantage is that if DARP Phase 3 support is signalled for one or more modes then six bits are used always.

{ 0 | 1 < DARP Phase 3 capability for voice channels: bit >
< DARP Phase 3 capability for GPRS: bit >
< DARP Phase 3 capability for EGPRS: bit >
< DARP Phase 3 capability for EGPRS2-A: bit >
< DARP Phase 3 capability for EGPRS2-B: bit > }

The definition of each of these capabilities is as follows.

DARP Phase 3 capability for voice channels (1 bit field)
This field indicates the DARP Phase 3 capability of the MS for voice channels. It is coded as follows:

| Bit | Indication |
|---|---|
| 0 | DARP Phase 3 not supported for voice channels |
| 1 | DARP Phase 3 supported for voice channels |

DARP Phase 3 capability for GPRS (1 bit field)
This field indicates the DARP Phase 3 capability of the MS GPRS. It is coded as follows:

| Bit | Indication |
|---|---|
| 0 | DARP Phase 3 not supported for GPRS |
| 1 | DARP Phase 3 supported for GPRS |

DARP Phase 3 capability for EGPRS (1 bit field)
This field indicates the DARP Phase 3 capability of the MS EGPRS. It is coded as follows:

| Bit | Indication |
|---|---|
| 0 | DARP Phase 3 not supported for EGPRS |
| 1 | DARP Phase 3 supported for EGPRS |

DARP Phase 3 capability for EGPRS2-A (1 bit field)
This field indicates the DARP Phase 3 capability of the MS EGPRS2-A. It is coded as follows:

| Bit | Indication |
|---|---|
| 0 | DARP Phase 3 not supported for EGPRS2-A |
| 1 | DARP Phase 3 supported for EGPRS2-A |

DARP Phase 3 capability for EGPRS2-B (1 bit field)
This field indicates the DARP Phase 3 capability of the MS EGPRS2-B. It is coded as follows:

| Bit | Indication |
|---|---|
| 0 | DARP Phase 3 not supported for EGPRS2-B |
| 0 | DARP Phase 3 not supported for EGPRS2-B |
| 1 | DARP Phase 3 supported for EGPRS2-B |

Alternatively the set of communication modes may comprise a set of modulation schemes. The term 'communication mode' can encompass either a communication protocol (e.g. GPRS or EDGE as previously described) or a modulation scheme, or a combination of both a communication protocol and a modulation scheme. According to option 5 below the set of communication modes comprises Gaussian Minimum Shift Keying (GMSK), 8-ary phase shift keying (8PSK), quadrature phase shift keying (QPSK), 16-ary quadrature amplitude modulation (16-QAM) and 32-ary quadrature amplitude modulation (32-QAM). The indicating data may comprise, for example, three bits which together indicate a subset of the set of communication modes. A different combination of three bits can be used to indicate each respective subset. Each combination of bits shown in option 5 below indicates a respective subset of the set GMSK, 8PSK, QPSK, 16-QAM and 32-QAM. Option 5 uses the same principles for signalling the indicating data as the principles used in option 1 described above. The difference between options 1 and 5 is that option 5 indicates interference capability for different modulation schemes whereas option 1 indicates interference capability for different communication protocols.

Option 5
According to option 5 a bit pattern defines for which modulation scheme DARP Phase 3 is supported. With this option DARP Phase 3 support is hierarchical and 3 bits are used always even if mobile indicates it does not support DARP Phase 3 capability.
<DARP Phase 3 capability: bit (3)>
The definition of the bit pattern is as follows.
DARP Phase 3 capability (3 bit field)
This field indicates the DARP Phase 3 capability of the MS. It is coded as follows:

| Bits 3 2 1 | Indication |
|---|---|
| 0 0 0 | DARP Phase 3 not supported. |
| 0 0 1 | DARP Phase 3 supported for GMSK modulation scheme |
| 0 1 0 | DARP Phase 3 supported for GMSK and QPSK modulation schemes |
| 0 1 1 | DARP Phase 3 supported for GMSK, QPSK and 8-PSK modulation schemes |
| 1 0 0 | DARP Phase 3 supported for GMSK, QPSK, 8-PSK and 16-QAM modulation schemes |
| 1 0 1 | DARP Phase 3 supported for GMSK, QPSK, 8-PSK, 16-QAM and 32-QAM modulation schemes |
| 1 1 0 | Reserved. Mobile station shall not use this value. If received by the network it shall be interpreted as 1 0 1 |
| 1 1 1 | Reserved. Mobile station shall not use this value. If received by the network it shall be interpreted as 1 0 1 |

It will be appreciated that the principles used in options 1 to 4, described previously above, may be used to indicate interference rejection capability for the set of modulation schemes GMSK, QPSK, 8-PSK, 16-QAM and 32-QAM or any other set of five modulation schemes. Three indicating bits may be used in this way for up to seven communication modes. If more than seven communication modes were used then more three bits would be used according to the bit mapping of the signalling bits in options 1 and 5.

The functions described herein may be implemented in hardware, software, firmware, or any combination thereof. The functions may be stored on a computer-readable medium or transmitted as one or more instructions or code over a computer-readable medium. Computer-readable media include any available medium that can be accessed by a computer or that facilitates transfer of a computer program or code in the form of instructions or data structures from one entity to another entity or from one place to another place.

Computer-readable media include, but are not limited to, computer storage media, communication media, memory, optical storage, magnetic storage, or a connection. For example, if software is transmitted from a website, server, or other remote source using a connection, that connection is included in the definition of computer-readable medium and can include but is not limited to coaxial cable, fibre optic cable, twisted pair, digital subscriber line (DSL), or wireless technologies such as infrared, radio, and microwave.

The terms disk and disc as used herein include compact disc (CD), laser disc, optical disc, digital versatile disc (DVD), floppy disk and blu-ray disc and may comprise any means for reproducing data magnetically or optically. Combinations of the above types of media should also be included within the scope of computer-readable media.

Having thus described the invention by reference to the method and apparatus shown in the accompanying drawings it is to be well understood that the method and apparatus in question are by way of example only and that modifications and variations such as will occur to those having appropriate knowledge and skills may be made without departure from the spirit and scope of the invention as set forth in the appended claims and equivalents thereof.

We claim:

1. A wireless communication system in which a network apparatus communicates with a mobile station in an interference environment, the system comprising:
a transmitter configured to transmit indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode the mobile station has interference rejection capabilities for;
a receiver configured to receive the indicating data; and
a resource allocator coupled to the receiver and responsive to the received indicating data configured to allocate system resources to be used during a connection between the network apparatus and the mobile station, the system resources are allocated based on a communication mode of the connection between the network apparatus and the mobile station, on the interference rejection capability indication of the mobile station for the communication mode of the connection, and on an expected interference environment expected during the connection, wherein the resource allocator is further configured to allocate the system resources to be used during the connection when the expected interference environment is adverse and the indicated interference rejection capability of the mobile station for the communication mode of the connection is suitable for the adverse interference environment.

2. The wireless communication system of claim 1, wherein the resource allocator is configured to allocate no system resources for use during the connection when the expected interference environment is an adverse interference environment and the interference rejection capability indication of the mobile station for the communication mode of the connection is not suitable for the adverse interference environment.

3. The wireless communication system of claim 1, wherein the indicating data comprises plural bits of information which together serve to provide the interference rejection capability indication for each of the plurality of communication modes.

4. The wireless communication system of claim 1, wherein the indicating data comprises plural individual bits of information, each individual bit of information corresponding to an interference rejection capability indication for a respective communication mode of the plurality of communication modes.

5. The wireless communication system of claim 1, wherein the plurality of communication modes that the mobile station is capable of operating in comprise at least one of GSM voice, GPRS, EGPRS, EGPRS2-A and EGPRS2-B.

6. The wireless communication system of claim 1, wherein the plurality of communication modes that the mobile station is capable of operating in comprise at least one of GMSK, QPSK, 8PSK, 16-QAM, and 32-QAM.

7. The wireless communication system of claim 1, wherein the mobile station comprises the transmitter.

8. The wireless communication system of claim 1, wherein the interference rejection capability complies with downlink advanced receiver performance Phase 3 interference rejection capability.

9. A network apparatus for use in a wireless communication system in communicating with a mobile station in an interference environment, the network apparatus comprising:
a receiver configured to receive indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and
a resource allocator coupled to the receiver and responsive to the received indicating data configured to allocate system resources to be used during a connection between the network apparatus and the mobile station, the system resources are allocated based on a communication mode of the connection between the network apparatus and the mobile station, on the interference rejection capability indication of the mobile station for the communication mode of the connection, and on an expected interference environment expected during the connection; wherein the resource allocator is further configured to allocate the system resources to be used during the connection when the expected interference environment is adverse and the indicated interference rejection capability of the mobile station for the communication mode of the connection is suitable for the adverse interference environment.

10. The network apparatus of claim 9, wherein the resource allocator
is configured to allocate no system resources for use during the connection when the expected interference environment is an adverse interference environment and the interference rejection capability indication of the mobile station for the communication mode of the connection is not suitable for the adverse interference environment.

11. The network apparatus of claim 9, wherein the indicating data comprises plural bits of information which together serve to provide the interference rejection capability indication for each of the plurality of communication modes.

12. The network apparatus of claim 9, wherein the indicating data comprises plural individual bits of information, each individual bit of information corresponding to an interference rejection capability indication for a respective communication mode of the plurality of communication modes.

13. The network apparatus of claim 9, wherein the plurality of communication modes that the mobile station is capable of operating in comprise at least one of GSM voice, GPRS, EGPRS, EGPRS2-A and EGPRS2-B.

14. The network apparatus of claim 9, wherein the plurality of communication modes that the mobile station is capable of operating in comprise at least one of GMSK, QPSK, 8PSK, 16-QAM, and 32-QAM.

15. The network apparatus of claim 9, wherein the interference rejection capability complies with downlink advanced receiver performance Phase 3 interference rejection capability.

16. A mobile station for use in a wireless communication system in which a network apparatus communicates with the mobile station in an interference environment, the mobile station comprising:
a transmitter configured to transmit indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and
a receiver configured to receive information indicating allocated system resources, from the wireless communication network, responsive to the transmitted indicating data, wherein the allocated system resources are used during a connection between the network apparatus and the mobile station, wherein the system resources are allocated based on a communication mode of the connection, on an interference rejection capability indication of the mobile station for the communication mode of the connection, and on an expected interference environment during the connection, and wherein the system resources are allocated when the expected interference environment is adverse and the indicated interference rejection capability of the mobile station for the communication mode of the connection is suitable for the adverse interference environment.

17. The mobile station of claim 16, wherein the indicating data comprises plural bits of information which together serve to provide the interference rejection capability indication for each of the plurality of communication modes.

18. The mobile station of claim 16, wherein the indicating data comprises plural individual bits of information, each individual bit of information corresponding to an interference rejection capability indication for a respective communication mode of the plurality of communication modes.

19. The mobile station of claim 16, wherein the plurality of communication modes that the mobile station is capable of operating in comprise at least one of GSM voice, GPRS, EGPRS, EGPRS2-A and EGPRS2-B.

20. The mobile station of claim 16, wherein the plurality of communication modes that the mobile station is capable of operating in comprise at least one of GMSK, QPSK, 8PSK, 16-QAM, and 32-QAM.

21. The mobile station of claim 16, wherein the interference rejection capability complies with downlink advanced receiver performance Phase 3 interference rejection capability.

22. A method of allocating system resources for use in a wireless communication system in which a network apparatus communicates with a mobile station in an interference environment, the method comprising:
transmitting indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode;
receiving the indicating data; and
allocating, in response to the received indicating data, system resources to be used during a connection between the network apparatus and the mobile station, the allocating of system resources is based on a communication mode of the connection between the network apparatus and the mobile station, on the interference rejection capability indication of interference rejection of the mobile station for the communication mode of the connection, and on an expected interference environment during the connection, wherein the system resources are allocated to be used during the connection when the expected interference environment is adverse and the indicated interference rejection capability of the mobile station for the communication mode of the connection is suitable for the adverse interference environment.

23. A network apparatus for use in a wireless communication system in which the network apparatus communicates with a mobile station in an interference environment, the network apparatus comprising:
a processor;
memory in electronic communication with the processor; and
instructions stored in the memory, the instructions being executable by the processor to:
receive indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and
allocate in response to the received indicating data system resources to be used during a connection between the network apparatus and the mobile station, the system resources are allocated based on a communication mode the connection between the network apparatus and the mobile station, on the interference rejection capability indication of the mobile station for the communication mode of the connection, and on an expected interference environment during the connection, wherein the system resources are allocated to be used during the connection when the expected interference environment is adverse and the indicated interference rejection capability of the mobile station for the communication mode of the connection is suitable for the adverse interference environment.

24. A computer program product for use in a network apparatus of a wireless communication system in which the network apparatus communicates with a mobile station in an interference environment, the computer program product comprising:
non-transitory computer-readable media comprising code for causing a computer to allocate in response to received indicating data system resources for use during a connection, the code comprising instructions to:
receive indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and
allocate in response to the received indicating data system resources to be used during a connection between the network apparatus and the mobile station, the system resources are allocated based on a communication mode of the connection between the network apparatus and the mobile station, on the interference rejection capability indication of the mobile station for the communication mode of the connection, and on an expected interference environment during the connection, wherein the system resources are allocated to be used during the connection when the expected interference environment is adverse and the indicated interference rejection capability of the mobile station for the communication mode of the connection is suitable for the adverse interference environment.

25. A mobile station for use in a wireless communication system in which a network apparatus communicates with the mobile station in an interference environment, the mobile station comprising:
a processor;
memory in electronic communication with the processor; and
instructions stored in the memory, the instructions being executable by the processor to:
transmit indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and receive, in response to the transmitted indicating data, information indicating allocated system resources from a wireless communication network, wherein the allocated system resources are used during a connection between the network apparatus and the mobile station, wherein the system resources are allocated based on a communication mode of the connection, on an interference rejection capability indication of the mobile station for the communication mode of the connection, and on an expected interference environment during the connection, and wherein the system resources are allocated when the expected interference environment is adverse and the indicated interference rejection capability of the mobile station for the communication mode of the connection is suitable for the adverse interference environment.

26. A computer program product for use in a mobile station of a wireless communication in which a network apparatus communicates with the mobile station in an interference environment, the computer program product comprising:

non-transitory computer-readable media comprising:
code for causing a computer to transmit indicating data, the code comprising instructions to:
transmit the indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and receive, in response to the transmitted indicating data, information indicating allocated system resources from a wireless communication network, wherein the allocated system resources are used during a connection between the network apparatus and the mobile station, wherein the system resources are allocated based on a communication mode of the connection, on an interference rejection capability indication of the mobile station for the communication mode of the connection, and on an expected interference environment during the connection, and wherein the system resources are allocated when the expected interference environment is adverse and the indicated interference rejection capability of the mobile station for the communication mode of the connection is suitable for the adverse interference environment.

27. A network apparatus for use in a wireless communication system for communicating with a mobile station in an interference environment, the network apparatus comprising:

means for receiving indicating data, wherein the indicating data comprises a plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and means for allocating, in response to the received indicating data, system resources for use during a connection between the network apparatus and the mobile station, the allocating of system resources depending on communication mode of the connection between the network apparatus and the mobile station, on the interference rejection capability indication of the mobile station for the communication mode of the connection, and on an expected interference environment during the connection, wherein the means for allocating is configured to allocate the system resources to be used during the connection when the expected interference environment is adverse and the indicated interference rejection capability of the mobile station for the communication mode of the connection is suitable for the adverse interference environment.

28. The network apparatus of claim 27, wherein the means for allocating is configured to allocate no system resources for use during the connection when the expected interference environment is an adverse interference environment and the interference rejection capability indication of the mobile station for the communication mode of the connection is not suitable for the adverse interference environment.

29. The network apparatus of claim 27, wherein the indicating data comprises plural bits of information which together serve to provide the interference rejection capability indication for each of the plurality of communication modes.

30. The network apparatus of claim 27, wherein the indicating data comprises plural individual bits of information, each individual bit of information corresponding to an interference rejection capability indication for a respective communication mode of the plurality of communication modes.

31. The network apparatus of claim 27, wherein the plurality of communication modes that the mobile station is capable of operating in comprise at least one of GSM voice, GPRS, EGPRS, EGPRS2-A and EGPRS2-B.

32. The network apparatus of claim 27, wherein the plurality of communication modes that the mobile station is capable of operating in comprise at least one of GMSK, QPSK, 8PSK, 16-QAM, and 32-QAM.

33. The network apparatus of claim 27, wherein the interference rejection capability complies with downlink advanced receiver performance Phase 3 interference rejection capability.

34. A mobile station for use in a wireless communication system in which a network apparatus communicates with the mobile station in an interference environment, the mobile station comprising:

means for determining a plurality of communication modes that the mobile station is capable of operating in;
means for determining which of the plurality of communication modes the mobile station has interference rejection capabilities for;
means for transmitting indicating data, wherein the indicating data comprises the plurality of communication modes that the mobile station is configured to operate in, and wherein the indicating data also comprises an interference rejection capability indication for each of the plurality of communication modes, wherein the interference rejection capability indication for a particular communication mode informs the network apparatus whether or not the mobile station has interference rejection capability for the particular communication mode; and
means for receiving, in response to the transmitted indicating data, information indicating allocated system resources from a wireless communication network, wherein the allocated system resources are used during a connection between the network apparatus and the mobile station, wherein the system resources are allocated based on a communication mode of the connection, on an interference rejection capability indication of the mobile station for the communication mode of the connection, and on an expected interference environment during the connection, and wherein the system resources are allocated when the expected interference environment is adverse and the indicated interference rejection capability of the mobile station for the communication mode of the connection is suitable for the adverse interference environment.

35. The mobile station of claim 34, wherein the indicating data comprises plural bits of information which together serve to provide the interference rejection capability indication for each of the plurality of communication modes.

36. The mobile station of claim 34, wherein the indicating data comprises plural individual bits of information, each individual bit of information corresponding to an interference rejection capability indication for a respective communication mode of the plurality of communication modes.

37. The mobile station of claim 34, wherein the plurality of communication modes that the mobile station is capable of operating in comprise at least one of GSM voice, GPRS, EGPRS, EGPRS2-A and EGPRS2-B.

38. The mobile station of claim 34, wherein the plurality of communication modes that the mobile station is capable of operating in comprise at least one of GMSK, QPSK, 8PSK, 16-QAM, and 32-QAM.

39. The mobile station of claim 34, wherein the interference rejection capability complies with downlink advanced receiver performance Phase 3 interference rejection capability.

40. In a communications network comprising multiple communication components configured to communicate with another communication component, a communication device comprising:
 a processor configured to determine indicating data, wherein the indicating data comprises a plurality of communication modes that the communication device is configured to operate in, and wherein the indicating data also comprises an interference rejection capability indication for each of the plurality of communication modes, wherein the interference rejection capability indication for a particular communication mode informs the network apparatus whether or not the communication device has interference rejection capability for the particular communication mode;
 a transmitter configured to transmit the indicating data; and
 a receiver configured to receive, in response to the transmitted indicating data, information indicating allocated system resources from a wireless communication network, wherein the allocated system resources are used during a connection between the network apparatus and the mobile station, wherein the system resources are allocated based on a communication mode of the connection, on an interference rejection capability indication of the mobile station for the communication mode of the connection, and on an expected interference environment during the connection, and wherein the system resources are allocated when the expected interference environment is adverse and the indicated interference rejection capability of the mobile station for the communication mode of the connection is suitable for the adverse interference environment.

41. The communication device of claim 40, further comprising at least one antenna configured to emit one or more signals comprising data representing the indicating data.

42. The communication device of claim 40, wherein said interference rejection capability represents the communication device's ability to reject interference during network communications.

43. The communication device of claim 40, further comprising an interference measuring module configured to measure actual interference observed at the communication device.

44. The communication device of claim 40, wherein the communication device is at least one of a mobile communication device or a stationary communication device.

45. The communication device of claim 40, wherein said interference rejection capability is represented by one or more bits capable of indicating an interference tolerance for the plurality of communication modes.

46. The communication device of claim 40, further comprising a resource allocator module configured to allocate network resources based on at least one of said plurality of communication modes or said interference rejection capability.

47. The communication device of claim 40, wherein the communications network includes a second communication device, said second communication device configured to receive at least one of said plurality of communication modes or said interference rejection capability from the communication device and in response thereto, said second communication device being configured to assess whether to alter its communications with the communication device.

* * * * *